(12) United States Patent
Alahyari

(10) Patent No.: US 10,864,993 B2
(45) Date of Patent: Dec. 15, 2020

(54) LIQUID VAPOR SEPARATOR

(71) Applicant: Hamilton Sundstrand Corporation, Charlotte, NC (US)

(72) Inventor: Abbas A. Alahyari, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 44 days.

(21) Appl. No.: 16/167,017

(22) Filed: Oct. 22, 2018

(65) Prior Publication Data
US 2020/0122842 A1    Apr. 23, 2020

(51) Int. Cl.
| | | |
|---|---|---|
| *B64D 13/06* | (2006.01) |
| *B01D 1/06* | (2006.01) |
| *F25B 39/02* | (2006.01) |
| *B01D 45/04* | (2006.01) |
| *B01D 45/02* | (2006.01) |
| *B01D 19/00* | (2006.01) |

(52) U.S. Cl.
CPC ............... *B64D 13/06* (2013.01); *B01D 1/06* (2013.01); *B64D 2013/0674* (2013.01); *F25B 39/02* (2013.01); *F25B 2339/0242* (2013.01); *F25B 2500/17* (2013.01); *F25B 2500/32* (2013.01)

(58) Field of Classification Search
CPC .. B64D 13/06; B64D 2013/0674; B01D 1/06; F25B 2339/0242; F25B 39/02; F25B 2500/32; F25B 2500/17
USPC ........................................................ 210/513
See application file for complete search history.

(56) References Cited

U.S. PATENT DOCUMENTS

| | | | | |
|---|---|---|---|---|
| 3,791,444 A | * | 2/1974 | Hickey | ................... E21B 34/06 166/54 |
| 5,314,529 A | | 5/1994 | Tilton et al. | |
| 6,238,464 B1 | | 5/2001 | Dullien | |
| 7,488,373 B2 | * | 2/2009 | Haland | .................. B01D 45/08 95/268 |
| 7,594,942 B2 | * | 9/2009 | Polderman | ............. B01D 45/08 55/321 |
| 7,875,092 B2 | * | 1/2011 | Christiansen | ............. B04C 3/06 55/319 |
| 9,168,475 B2 | | 10/2015 | Dorao et al. | |
| 9,895,629 B2 | * | 2/2018 | Koppen | ................. B01D 53/18 |

(Continued)

FOREIGN PATENT DOCUMENTS

GB          1192146          5/1970

OTHER PUBLICATIONS

European Patent Office, Extended European Search Report, Application No. 19204395.8-1101, dated Jan. 30, 2020 (8 pp.).

*Primary Examiner* — Claire A Norris
*Assistant Examiner* — Ekandra S. Miller-Cruz
(74) *Attorney, Agent, or Firm* — Cantor Colburn LLP

(57) ABSTRACT

Disclosed is a separation system including: a chamber comprising: an inlet for receiving a two-phase fluid; a first outlet for draining liquid contained in the two-phase fluid; a second outlet for egress of gas contained in the two-phase fluid; a cylindrical body disposed in the chamber having a plurality of channels through which, during use, the two-phase fluid travels from the inlet to the second outlet, and wherein the liquid within the two-phase fluid coalesces on the walls of the plurality of channels as the two-phase fluid passes through the plurality of channels and the liquid drains through the first outlet.

9 Claims, 5 Drawing Sheets

(56) References Cited

U.S. PATENT DOCUMENTS

2010/0229582 A1\* 9/2010 Yamada ............... F25B 1/10
  62/238.7
2011/0011105 A1 1/2011 Valiya Naduvath et al.
2011/0056379 A1 3/2011 Lucas
2017/0321936 A1 11/2017 Cho \* cited by examiner

LIQUID VAPOR SEPARATOR

BACKGROUND

Compact liquid-vapor separators may be of interest in a variety of applications. In particular, in HVAC applications, compact separators can enable reduction of size and weight in flash tanks and economizers as well as improving flow distribution upstream of evaporators. Also, effective separators can be used to remove and bypass vapor flow during the evaporation process in an evaporator in order to reduce heat exchanger size and pressure drop. The key challenge is that as separator size is reduced, velocities increase thereby increasing the likelihood of liquid carryover and degrading the effectiveness of the separator.

BRIEF DESCRIPTION

Disclosed is a separation system comprising: a chamber comprising: an inlet for receiving a two-phase fluid; a first outlet for draining liquid contained in the two-phase fluid; a second outlet for egress of gas contained in the two-phase fluid; a cylindrical body disposed in the chamber having a plurality of channels through which, during use, the two-phase fluid travels from the inlet to the second outlet, and wherein the liquid within the two-phase fluid coalesces on the walls of the plurality of channels as the two-phase fluid passes through the plurality of channels and the liquid drains through the first outlet.

In addition to one or more of the above disclosed features or as an alternate the inlet is gravitationally above the first outlet and gravitationally below the second outlet.

In addition to one or more of the above disclosed features or as an alternate the cylindrical body having an outer diameter that is smaller than a diameter of an inner wall of the chamber, thereby defining an outer channel in the chamber, wherein captured liquid flows gravitationally along the outer channel to the outlet.

In addition to one or more of the above disclosed features or as an alternate the cylindrical body has a top surface, the top surface being gravitationally below the second outlet.

In addition to one or more of the above disclosed features or as an alternate the plurality of circular channels is a first plurality of circular channels, wherein the system further includes: an endcap covers the top surface of the cylindrical body, the end cap comprising a second plurality of channels configured to be received within a respective one of the first plurality of circular channels to define an plurality of gap channels for capturing coalescing fluid and guiding coalescing fluid to the outer channel.

In addition to one or more of the above disclosed features or as an alternate a top portion of the cylindrical body comprises the plurality of circular channels, and a bottom portion of the cylindrical body comprises a single channel.

In addition to one or more of the above disclosed features or as an alternate the top portion and the bottom portion of the cylindrical body have a same length.

In addition to one or more of the above disclosed features or as an alternate the cylindrical body has a constant outer diameter so that the single channel has a flow area that is substantially the same as a sum of the flow areas from the plurality of circular channel.

In addition to one or more of the above disclosed features or as an alternate the first outlet is frusto-conical.

In addition to one or more of the above disclosed features or as an alternate the second outlet is cylindrical having a diameter that defines a diameter of the chamber.

In addition to one or more of the above disclosed features or as an alternate the inlet is cylindrical having a first diameter that is smaller than a diameter of the chamber.

Further disclosed is an aircraft HVAC system comprising the system disclosed hereinabove.

In addition to one or more of the above disclosed features or as an alternate the two-phase fluid is evaporated refrigerant.

Further disclosed is method of separating liquid and vapor comprising: receiving a two phase vapor at a chamber inlet, transporting the two phase vapor upwardly through a plurality of adjacently disposed circular channels in the chamber, whereby fluid coalesces on channel walls scooped through a gap, and drains through an outlet gravitationally below the inlet.

In addition to one or more of the above disclosed features or as an alternate gas exits through an outlet located gravitationally above the inlet.

In addition to one or more of the above disclosed features or as an alternate liquid drains through an outer channel defined between and outer wall of a cylindrical body and an inner wall of the chamber, wherein the cylindrical body comprises the plurality of adjacently disposed circular channels.

In addition to one or more of the above disclosed features or as an alternate two phase fluid flows upwardly through a single channel in the chamber and then through the plurality of adjacently disposed circular channels, wherein a diameter of the single channel is greater than the diameters for the plurality of adjacently disposed circular channels.

In addition to one or more of the above disclosed features or as an alternate the two phase fluid flows upwardly through the single channel by a same axial distance as through the plurality of adjacently disposed circular channels.

In addition to one or more of the above disclosed features or as an alternate coalescing fluid is captured and guided to the outer channel by a plurality of cylindrical gap channels at an axial top of each of the plurality of cylindrical channels.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
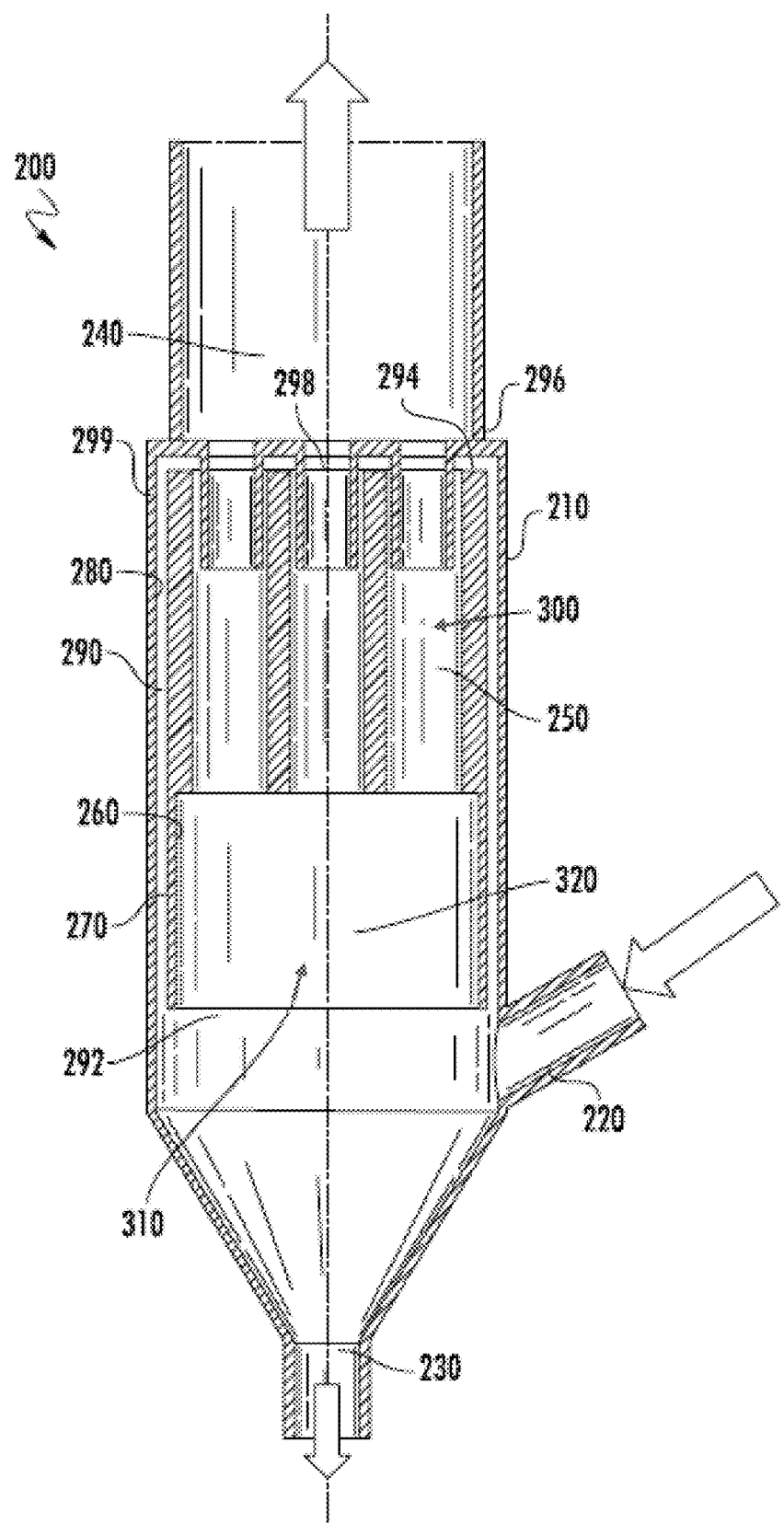
FIG. 1 illustrates a separator according to an embodiment.
Figure 2:
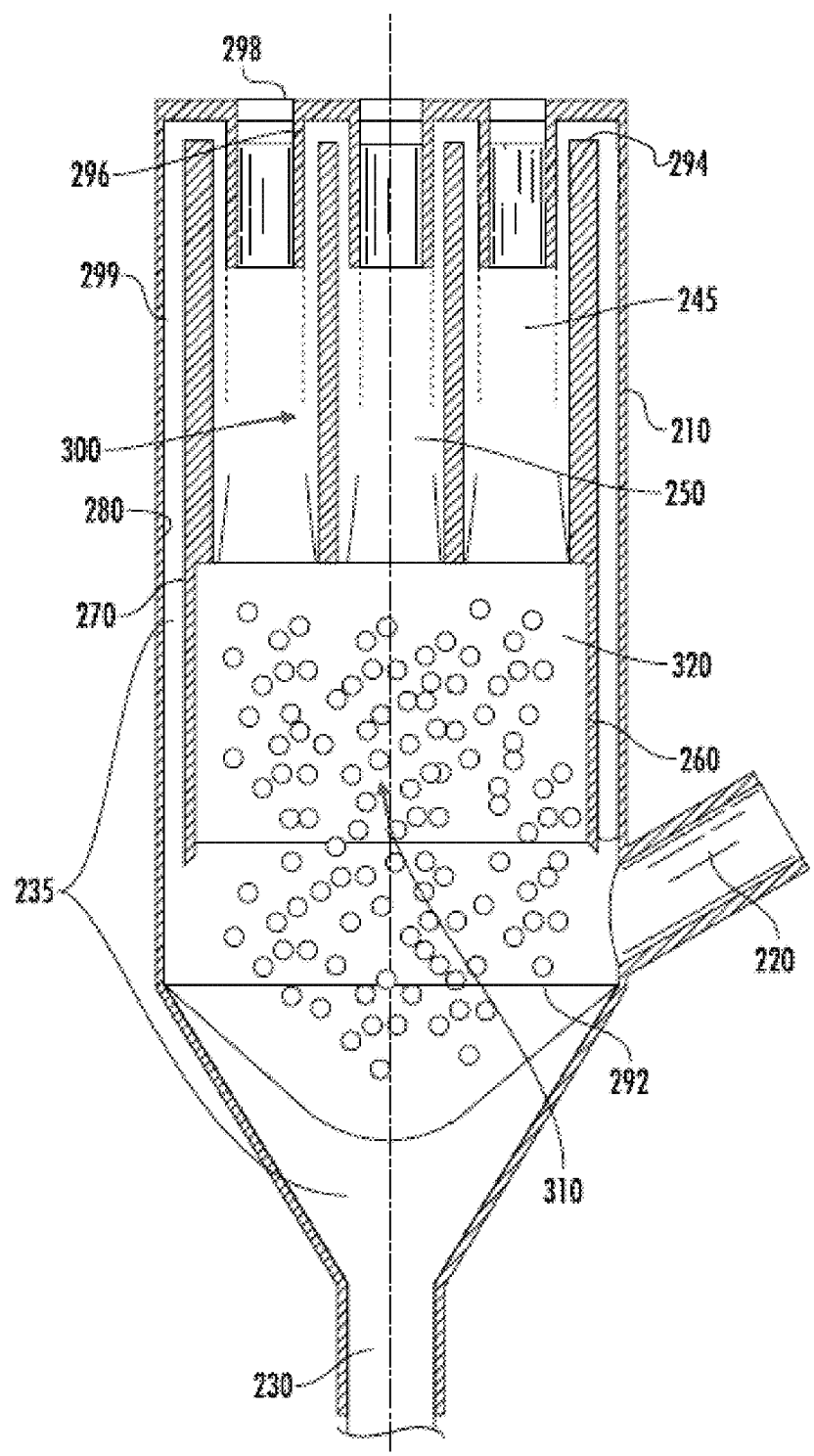
FIG. 2 illustrates liquid filming on walls of separator of FIG. 1.
Figure 3:
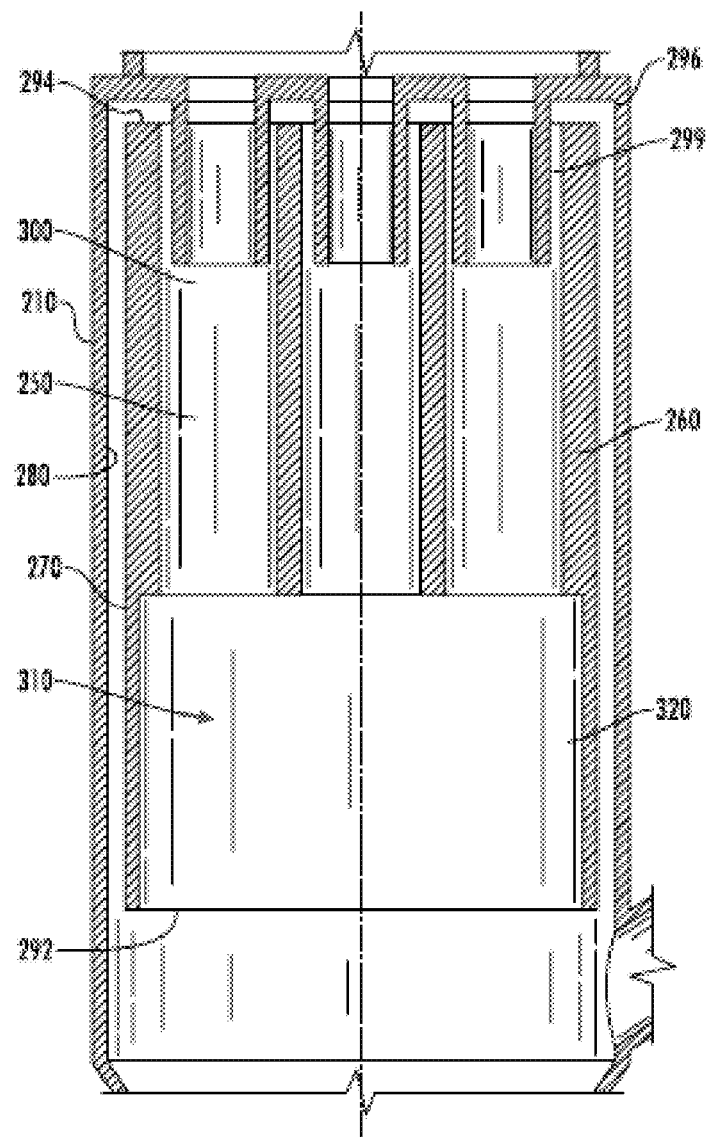
FIG. 3 illustrates a portion of the separator of FIG. 1.
Figure 4:
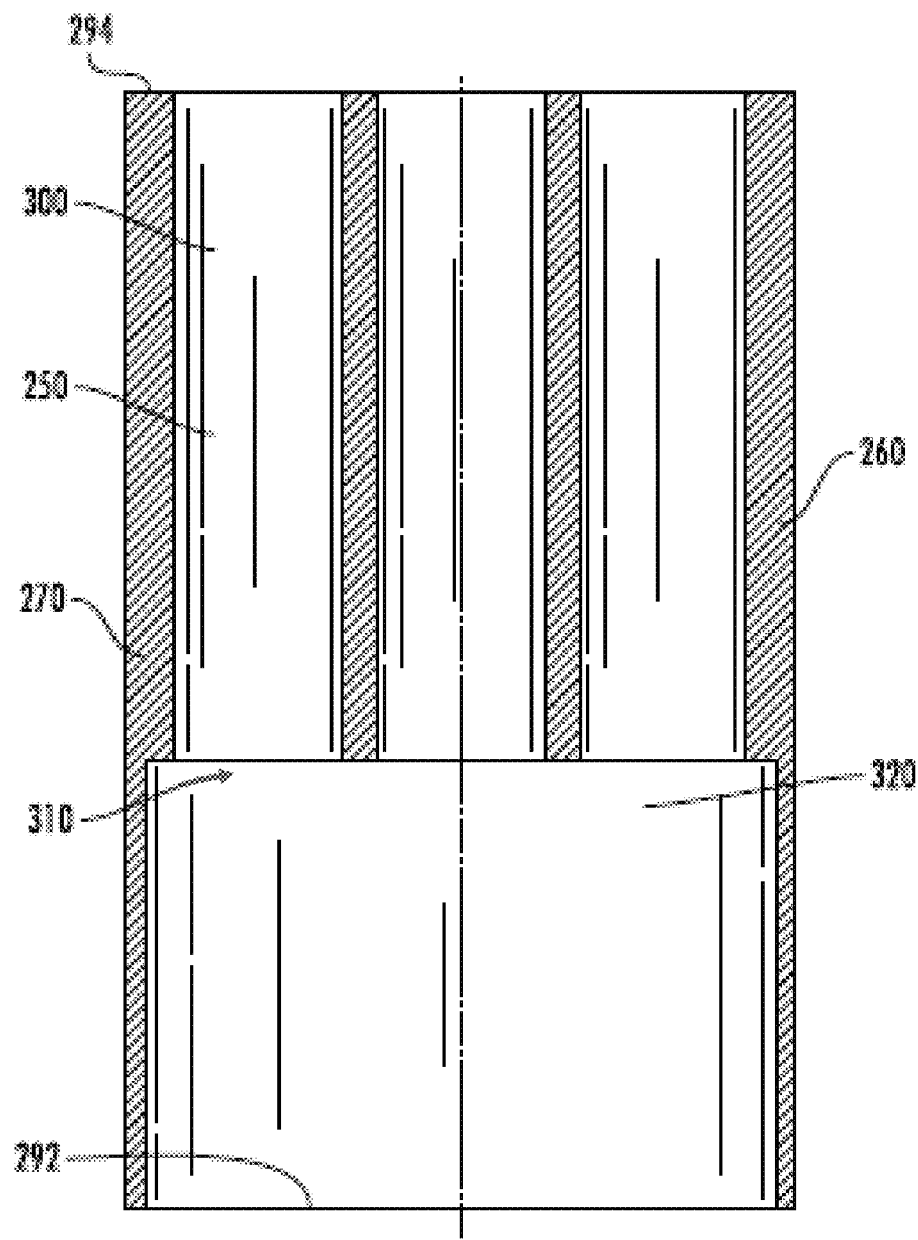
FIG. 4 illustrates a cylindrical body within the chamber of the separator of FIG. 1.
Figure 5:
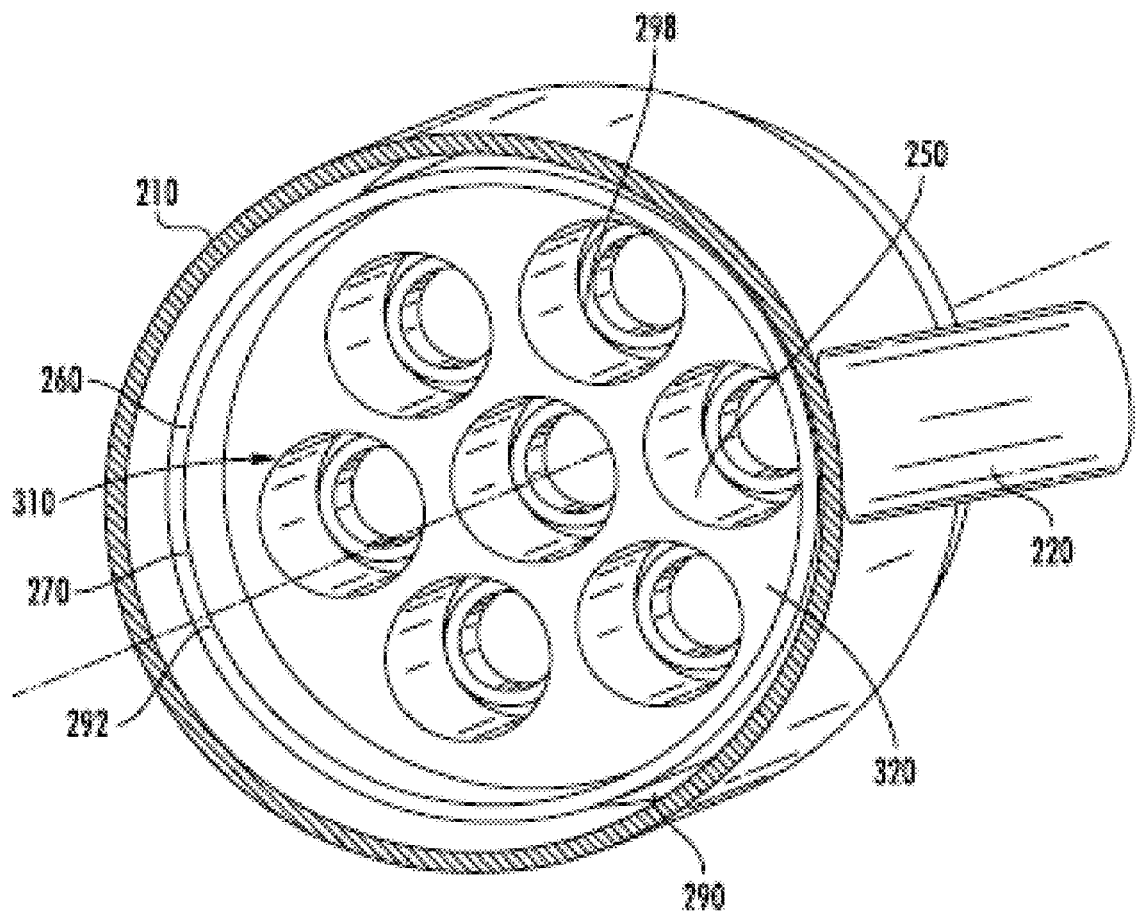
FIG. 5 illustrates the separator of FIG. 1 in a bottom perspective view.

Turning to FIGS. 1-5, disclosed is a liquid-vapor separator system 200 comprising a chamber 210. The chamber 210 comprises an inlet 220 for receiving two-phase fluid 225, a first outlet 230 for draining the liquid portion 235, and a second outlet 240 for egress of gas 245. The chamber 210 includes a plurality of circular channels 250 for transporting the two phase vapor therein, wherein fluid 235 films on the circular channels 250 and drains through the first outlet 230. In one embodiment the inlet 220 is gravitationally above the first outlet 230 and gravitationally below the second outlet 240.

In one embodiment the plurality of circular channels 250 are formed in a body 260, which may be cylindrical (hereinafter the "cylindrical body 260"). The cylindrical body 260 has an outer wall 270 with an outer diameter and the chamber 260 has an inner wall 280 with an inner diameter. The outer diameter 270 of the cylindrical body is smaller than the inner diameter 280 of the chamber to define an outer channel 290 in the chamber 210. With this configuration, captured fluid 235 flows gravitationally along the outer channel 290 to the first outlet 230. In one embodiment the cylindrical body 260 has a bottom surface 292, wherein the bottom surface 292 of the cylindrical body 260 is gravitationally above the inlet 220. In one embodiment the cylindrical body 260 has a top surface 294, wherein the top surface 294 of the cylindrical body 260 is gravitationally below the second outlet 240.

In one embodiment the plurality of circular channels 250 is a first plurality of circular channels. In such embodiment an endcap 296 may cover the top surface 294 of the cylindrical body 260. The end cap 296 may comprise a second plurality of channels 298 configured to be mating received in the respective first plurality of circular channels 250 so as to provide a gap between the plurality of channels. That is, this configuration defines a plurality of cylindrical gap channels 299 at an axial top of the first plurality of channels 250 for capturing coalescing fluid and guiding coalescing fluid to the outer channel 290.

In one embodiment a top portion 300 of the cylindrical body 260 comprises the plurality of circular channels and a bottom portion 310 of the cylindrical body 260 comprises a single channel 320. In one embodiment the cylindrical body has a constant outer diameter along its length so that the single channel 32 has a flow area that is substantially the same as a sum of the flow areas from the plurality of circular channels 260. In one embodiment the top portion 300 and the bottom portion 310 have a same axial span.

In one embodiment the first outlet is frusto-conical. In one embodiment the second outlet is cylindrical having a diameter that defines a diameter of the chamber. In one embodiment the inlet is cylindrical having a first diameter that is smaller than a diameter of the chamber. As can be appreciated the above disclosed system may be used in a refrigerant system such as an aircraft heating ventilation and air conditioning (HVAC) system having an aircraft or land application. In such use, the fluid would be refrigerant.

With the separator disclosed herein, vapor (along with entrained liquid droplets) flow through a series of circular channels. The channels are sized such that the flow develops an annular flow pattern. The flow develops in part to a liquid film coalesced on the channel walls. The liquid film is then stripped off by a second series of channels and returned to the liquid pool at the bottom of the separator. The disclosed process may provide an effective separation process with relatively low pressure drop. Benefits of the disclose embodiments include a reduced size and weight of flash tanks and heat exchangers, an improved flow distribution for evaporators (microchannel or brazed-plate), and an improved performance through flash gas bypass, especially for lower pressure refrigerants.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigerant system comprising:
a separation system including a cylindrical chamber, the cylindrical chamber comprising:
a chamber inlet for receiving a two-phase fluid;
a first outlet for draining liquid contained in the two-phase fluid;
a second outlet for egress of gas contained in the two-phase fluid, wherein the chamber inlet is gravitationally above the first outlet and gravitationally below the second outlet;
a cylindrical body disposed in the cylindrical chamber having a first plurality of circular channels that are disposed adjacent to each other, through which, during use, the two-phase fluid travels from the chamber inlet to the second outlet, and wherein the liquid within the two-phase fluid coalesces on walls of the first plurality of circular channels as the two-phase fluid passes through the first plurality of circular channels and the liquid is returned to the first outlet, and
wherein:
a top portion of the cylindrical body comprises the first plurality of circular channels, and a bottom portion of the cylindrical body comprises a single channel,
wherein a diameter of the single channel is greater than the diameters for the first plurality of circular channels; and
a bottom surface of the cylindrical body is gravitationally above the chamber inlet;
the cylindrical body has an outer diameter that is smaller than a diameter of an inner wall of the cylindrical chamber, thereby defining an outer channel in the cylindrical chamber therebetween, wherein the outer channel extends a length of the cylindrical body from a top of the first plurality of circular channels to the chamber inlet, and wherein captured liquid flows gravitationally along the outer channel to the first outlet,
wherein,
the second outlet of the cylindrical chamber is cylindrical having a diameter that defines a diameter of the cylindrical chamber, and an endcap covers a top surface of the cylindrical body to define the second outlet, the end cap comprising a second plurality of circular channels configured to be respectively received within the first plurality of circular channels, wherein a plurality of gap channels is defined between the second plurality circular channels and the first plurality of circular channels for capturing coalescing liquid and guiding the coalescing liquid to the outer channel, so that the coalescing liquid flows gravitationally along the outer channel to the first outlet.

2. The refrigerant system of claim 1, wherein the top surface of the cylindrical body is gravitationally below the second outlet.

3. The refrigerant system of claim 1, wherein the top portion and the bottom portion of the cylindrical body have a same length.

4. The refrigerant system of claim 3, wherein the cylindrical body has a constant outer diameter.

5. The refrigerant system of claim 1, wherein the first outlet is frusto-conical.

6. The refrigerant system of claim 1, wherein the chamber inlet is cylindrical having a first diameter that is smaller than a diameter of the cylindrical chamber.

7. The refrigerant system of claim 1, wherein the two-phase fluid is evaporated refrigerant.

8. A method of separating liquid and vapor in a refrigerant system comprising:
- receiving a two-phase fluid at a chamber inlet of a cylindrical chamber,
- transporting the two-phase fluid upwardly through a first plurality of circular channels that are disposed adjacent to each other in the cylindrical chamber, whereby fluid coalesces on channel walls scooped through one or more gap channels, and drains through a first outlet gravitationally below the chamber inlet, wherein
the cylindrical chamber further comprises:
- a second outlet for egress of gas contained in the two-phase fluid, wherein the chamber inlet is gravitationally above the first outlet and gravitationally below the second outlet;
- a cylindrical body disposed in the cylindrical chamber having the first plurality of circular channels that are disposed adjacent to each other, through which, during use, the two-phase fluid travels from the chamber inlet to the second outlet, and wherein the liquid within the two-phase fluid coalesces on walls of the first plurality of circular channels as the two-phase fluid passes through the first plurality of circular channels and the liquid is returned to the first outlet, and wherein:
a top portion of the cylindrical body comprises the first plurality of circular channels, and a bottom portion of the cylindrical body comprises a single channel, wherein a diameter of the single channel is greater than the diameters for the first plurality of circular channels; and a bottom surface of the cylindrical body is gravitationally above the chamber inlet;

the cylindrical body has an outer diameter that is smaller than a diameter of an inner wall of the cylindrical chamber, thereby defining an outer channel in the cylindrical chamber therebetween, wherein the outer channel extends a length of the cylindrical body from a top of the first plurality of circular channels to the chamber inlet, and wherein captured liquid flows gravitationally along the outer channel to the first outlet, wherein;
the second outlet of the cylindrical chamber is cylindrical having a diameter that defines a diameter of the cylindrical chamber, and an end cap covers a top surface of the cylindrical body to define the second outlet, the end cap comprising a second plurality of circular channels configured to be respectively received within the first plurality of circular channels, wherein a plurality of gap channels is defined between the second plurality circular channels and the first plurality of circular channels for capturing coalescing liquid and guiding the coalescing liquid to the outer channel, so that the coalescing liquid flows gravitationally along the outer channel to the first outlet.

9. The method of claim 8, wherein the two phase fluid flows upwardly through the single channel by a same axial distance as through the first plurality of circular channels.

* * * * *